Feb. 7, 1967     W. E. KING     3,302,328
PLANT SUPPORT
Filed Nov. 8, 1965
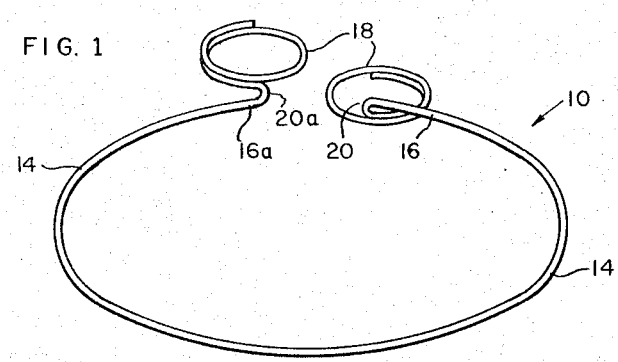
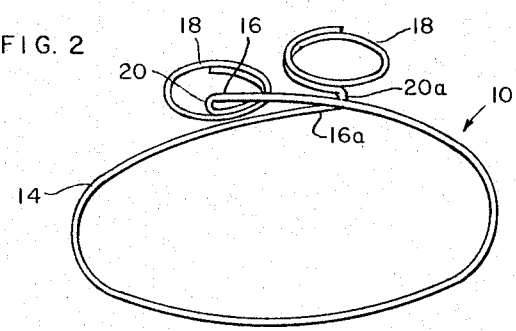
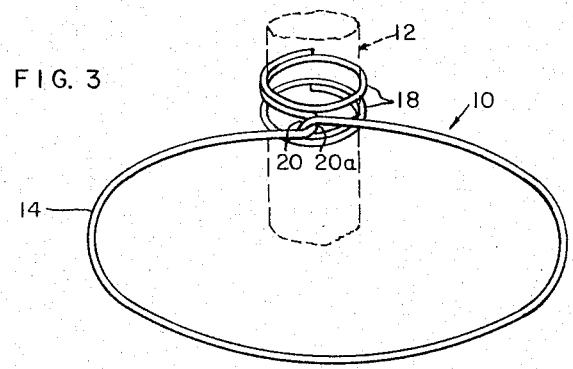
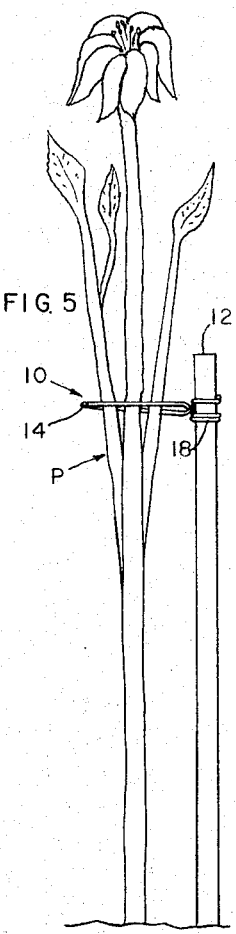
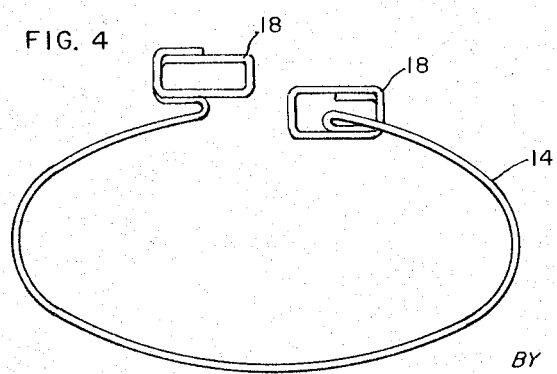
WILLIAM E. KING
*INVENTOR*
BY
BUCKHORN, BLORE, KLARQUIST & SPARKMAN
*ATTORNEYS*

United States Patent Office 3,302,328
Patented Feb. 7, 1967

3,302,328
PLANT SUPPORT
William E. King, 3016 60th Ave. SW.,
Seattle, Wash. 98116
Filed Nov. 8, 1965, Ser. No. 506,816
2 Claims. (Cl. 47—47)

This invention relates to means for supporting growing plants and, more particularly, to means for supporting heavy plants in conjunction with an upright stake which is driven into the ground.

There have been numerous devices for supporting a plant in conjunction with an upright stake. These devices generally comprise a plant-embracing member which encircles the plant and is held in a substantially horizontal plane, perpendicular to the upright stake, by its attachment thereto. Many of these devices are unduly complicated. If simple, as is the device of the present invention, they are generally inadequate to support the heavier plants.

An object of the present invention is thus to provide a plant support which, while simple and economical to manufacture, will be suitable for heavier plants.

Other objects and advantages will become apparent as the invention is described in detail.

In the drawings:

FIG. 1 is a perspective view of the plant support of the present invention, showing it in its open position and prior to being attached to an upright stake;

FIG. 2 is a perspective view of the plant support of the present invention shown with the ends of the loop crossing over each other;

FIG. 3 is a perspective view of the plant support of the present invention, showing it attached to an upright stake (shown in phantom) and in position to support a plant;

FIG. 4 is a perspective view showing a different embodiment of the invention; and FIG. 5 is a side view of the plant support of the present invention shown supporting a plant.

Referring first to FIG. 5, the plant support 10 of the present invention is adapted to support a plant P in conjunction with an upright stake 12. The support 10 comprises a wire loop 14, which is preferably made of resilient wire material, of suitable diameter to encircle the plant to be supported. The loop may be as small as 6 inches or as large as required.

Referring to FIG. 1, the loop 14 is so formed that the ends 16 and 16a thereof are spread slightly apart when the support is free of the stake. This will be further explained hereinafter.

At each of the two ends 16 and 16a of the wire loop 14, a helix 18 is formed. Each of the helices 18 is adapted to be slipped over the stake 12. The size of the helix 18 is such that it has a minimum of clearance around the stake 12, thereby to maintain the loop 14 in a plane substantially at right angles to the stake. The size of the helix 18, however, is such that the support 10 can be moved up and down on the stake, as desired. The helix 18 may be round, as illustrated in FIGS. 1, 2 and 3, or it may be square as shown in FIG. 4, or it may take any other shape, thereby to fit the cross-section of the stake 12.

An important feature of the present invention resides in the fact that each of the two ends 16 and 16a of the wire loop 14 is formed with a reverse curve 20, 20a at the point of junction of its associated helix 18, as shown in FIG. 1. Before the helices 18 are slipped over the end of the stake 12, the ends 16 and 16a of the loop 14 are crossed over each other (see FIG. 2) such that they engage each other at the reverse curves 20, 20a (see FIG. 3), thereby applying a compressive force to the loop 14. Such configuration strengthens the entire plant support, thereby better to support the heavier plants.

It should also be noted that the reverse curve 20 at the end 16 of the loop 14 is bent downwardly out of the plane of the loop, while the reverse curve 20a at the other end 16a of the loop 14 is bent upwardly out of the plane of the loop. This facilitates the engagement of the ends of the loop with each other, as above described. It also insures that the outwardly directed force generated by the bending of the resilient loop is maintained internal to the plant support 10 and is not in any way applied to the stake 12. This permits the support 10 to be moved easily up and down on the stake, as desired, yet the size of the helices 18 keeps the loop substantially perpendicular to the stake.

In the foregoing description, the invention has been described with reference to certain particular prescribed embodiments, though it is to be understood that the specific details shown are merely illustrative and that the invention may be carried out in other ways without departing from the true spirit and scope of the appended claims.

Having thus described my invention what I desire to claim and protect by Letters Patent is:

1. A plant support adapted to support a plant in conjunction with an upright stake, comprising:
   a resilient wire loop adapted to encircle the plant,
   and a helix formed at each end of said loop,
      each of said helices being adapted to slip over said stake and maintain said loop in a plane substantially at right angles to said stake,
   each end of said loop being formed with a reverse curve defining a U-shaped portion at the point of juncture of said helix, said U-shaped portions having open ends directed oppositely,
   said ends of said loop crossing over and engaging each other at said reverse curves.

2. A plant support as in claim 1,
   in which the reverse curve at one end of said loop is bent downwardly out of the plane of said loop, and the reverse curve at the other end of said loop is bent upwardly out of the plane of said loop.

References Cited by the Examiner
UNITED STATES PATENTS
2,009,668   7/1935   Lay _____ 47—47
FOREIGN PATENTS
394,074   6/1933   Great Britain.
419,297   11/1934   Great Britain.

ANTONIO F. GUIDA, Acting Primary Examiner.
ABRAHAM G. STONE, Examiner.
R. CARTER, Assistant Examiner.